United States Patent

Zalewski et al.

Patent Number: 5,725,453
Date of Patent: Mar. 10, 1998

[54] ON-DEMAND DOUBLE OFFSET TRANSFER CASE

[75] Inventors: John D. Zalewski, Liverpool; James S. Brissenden, Baldwinsville, both of N.Y.

[73] Assignee: New Venture Gear, Inc., Troy, Mich.

[21] Appl. No.: 516,442

[22] Filed: Aug. 17, 1995

[51] Int. Cl.$^6$ .............................. F16H 37/08; F16H 48/06
[52] U.S. Cl. .................. 475/204; 475/206; 475/222; 180/248; 74/665 G
[58] Field of Search ........................... 475/202, 204, 475/206, 222, 223, 295; 180/247, 248, 249, 250; 74/665 G

[56] References Cited

U.S. PATENT DOCUMENTS

| | | | |
|---|---|---|---|
| 2,314,833 | 3/1943 | Keese | 180/248 X |
| 2,716,461 | 8/1955 | MacPherson | 475/202 X |
| 2,851,115 | 9/1958 | Buckendale | 180/248 X |
| 2,875,644 | 3/1959 | Mancini | 475/222 X |
| 2,904,905 | 9/1959 | Armington | 180/248 X |
| 3,827,520 | 8/1974 | Mueller | 180/249 |
| 3,929,200 | 12/1975 | Behar | 180/249 X |
| 4,632,207 | 12/1986 | Moore | 180/247 |
| 4,677,873 | 7/1987 | Eastman et al. | 74/665 GE |
| 4,688,447 | 8/1987 | Dick | 74/665 F |
| 4,938,738 | 7/1990 | Fuelberth et al. | 475/317 |
| 5,078,660 | 1/1992 | Williams et al. | 475/84 |
| 5,106,351 | 4/1992 | Williams et al. | 475/250 |
| 5,116,293 | 5/1992 | Reuter | 475/202 |
| 5,159,847 | 11/1992 | Williams et al. | 74/337.5 |
| 5,269,399 | 12/1993 | Ito et al. | 180/248 X |
| 5,310,388 | 5/1994 | Okcuoglu et al. | 475/88 |
| 5,335,747 | 8/1994 | Muller | 475/206 |
| 5,358,454 | 10/1994 | Bowen et al. | 475/94 |
| 5,363,938 | 11/1994 | Wilson et al. | 180/233 |
| 5,456,642 | 10/1995 | Frost | 475/93 |

*Primary Examiner*—Khoi Q. Ta
*Attorney, Agent, or Firm*—Harness, Dickey & Pierce, P.L.C.

[57] ABSTRACT

A power transfer system for a four-wheel drive vehicle is having a part-time transfer case with its input angled relative to its outputs by means of a constant velocity (CV) universal joint. More specifically, the transfer case input includes a first rotary member adapted to be rotatably driven about the rotary axis of the transmission output shaft, a second rotary member supported for rotation about a second rotary axis that is angled relative to the first rotary axis, and a CV joint interconnecting the first and second rotary members. The transfer case outputs include a pair of rotary output members supported for relative rotation about a common third rotary axis that is offset from the second rotary axis. A torque transfer arrangement is provided for transferring torque from the transfer case input to its outputs. As such, the CV joint allows the transfer case to be angulated so that reduced departure angles are achieved with respect to the prop shaft connections. The part-time transfer case includes a two-speed reduction apparatus and a mode shift arrangement for permitting the vehicle operator to select operation in various two-wheel and four-wheel drive modes.

26 Claims, 10 Drawing Sheets

ON-DEMAND DOUBLE OFFSET TRANSFER CASE

BACKGROUND Of THE INVENTION

The present invention relates to a power transfer system for a four-wheel drive motor vehicle and, in particular, to a transfer case having means for establishing an angular driving connection between the transfer case input and the output of a multi-speed transmission.

In view of the increased popularity of four-wheel drive vehicles, a plethora of power transfer systems are currently utilized for distributing tractive power (i.e., drive torque) to all four wheels of the motor vehicle. Conventionally, most four-wheel drive power transfer systems include a transfer case having an input shaft driven by the transmission output shaft, a rear output shaft driven by the input shaft and which is interconnected via a rear prop shaft to a rear axle assembly for driving the rear wheels, a front output shaft interconnected via a front prop shaft to a front axle assembly for driving the front wheels, and a torque transfer arrangement for continuously or selectively transferring drive torque from the rear output shaft to the front output shaft.

In "part-time" four-wheel drive systems, the transfer case is equipped with a shift mechanism which permits the vehicle operator to selectively couple and de-couple the front and rear output shafts for shifting the vehicle between a two-wheel drive mode and a four-wheel drive mode. An example of a part-time transfer case is shown and disclosed in commonly-owned U.S. Pat. No. 5,159,847 to Williams et al. In "full-time" four-wheel drive systems, the transfer case is equipped with an interaxle differential for continuously dividing drive torque between the front and rear output shafts while permitting speed differentiation therebetween. In order to prevent traction loss due to excessive wheel slip, most full-time transfer cases are also equipped with a "slip limiting" device for selectively or automatically locking the interaxle differential to limit or prevent speed differentiation in response to the wheel slip. Commonly-owned U.S. Pat. No. 5,106,351 to Williams et al. discloses an exemplary full-time transfer case equipped with a viscous coupling for limiting slip across the interaxle differential.

Alternatively, "on-demand" power transfer systems are used for automatically directing power to the non-driven wheels, without any input or action on the part of the vehicle operator, when traction is lost at the driven wheels. Typically, a speed-sensitive torque transfer device is installed between the front and rear output shafts for progressively delivering torque to the front output shaft in response to increasing speed differential therebetween. Such torque transfer devices commonly include viscous couplings, geared coupling and the like. An exemplary geared torque transfer device is disclosed in commonly-owned U.S. Pat. No. 5,358,454 to Bowen et al. More recently, however, the torque transfer device used in on-demand four-wheel drive systems has been a modulatable clutch, the output of which is controlled electronically in response to various detected vehicle operating parameters. An example of an electronically-controlled on-demand power transfer system is disclosed in commonly-owned U.S. Pat. No. 5,363,938 to Wilson et al.

Transfer cases are commonly classified as being either of a single offset type or a double offset type. In single offset transfer cases, only one of the output shafts is offset from the rotational axis of the input shaft. In particular, several of the above-noted commonly owned patents illustrate a conventional arrangement wherein the rotary axis of the rear output shaft is commonly aligned with that of the input shaft while the rotary axis of the front output shaft is parallel to, yet offset from, the rotary axis of the input shaft. However, a problem commonly associated with this type of transfer case is that the rear prop shaft, due to its central alignment, takes up a substantial amount of the vehicle's underbody space which inhibits placement of an underbody spare tire and/or necessitates usage of a saddle-type gas tank. In double offset transfer cases, the front and rear output shafts are commonly aligned and are both offset from the rotary axis of the input shaft. Accordingly, such double offset transfer cases provide increased underbody space for purposes of locating a spare tire and/or installing a larger fuel tank.

A major design consideration in the development of four-wheel drive systems is to minimize the departure angles at the connections between the transfer case front and rear output shafts and their corresponding prop shafts. The departure angle is defined as the included angle between the rotary axis of the prop shaft and that of the transfer case output shaft. Traditionally, single cardan universal joints are used at each end of the prop shafts if the departure angle is less than about five degrees. If the departure angles exceed this threshold limit, then more expensive double cardan universal joints are required at the prop shaft/transfer case connection. As an alternative, U.S. Pat. Nos. 4,632,207 to Moore and 5,116,293 to Reuter disclose the use of a constant velocity (CV) joint at the front output of a single offset type of transfer case. An alternative arrangement is likewise shown in U.S. Pat. No. 4,688,447 to Dick. While such arrangements attempt to solve the problems associated with large departure angles at the front output, they do not address this concern at the rear output nor are the teachings applicable to double offset transfer cases.

SUMMARY OF THE INVENTION

Accordingly, the present invention is directed to overcoming the disadvantages associated with conventional four-wheel drive systems by providing a power transfer system having a transfer case with its input angled relative to its outputs by means of a constant velocity (CV) universal joint. More specifically, the transfer case input includes a first rotary member adapted to be driven about the rotary axis of the transmission output shaft, a second rotary member supported for rotation about a second rotary axis that is angled relative to the first rotary axis, and a CV joint interconnecting the first and second rotary members. The transfer case outputs include a pair of rotary output members supported for relative rotation about a third rotary axis that is offset from the second rotary axis. As such, the CV joint allows the transfer case to be angulated so that reduced departure angles are achieved with respect to the prop shaft connections.

A further feature of the present invention is to provide a CV joint in the input section of an On-Demand transfer case. In one preferred form, the transfer case is equipped with a two-speed reduction apparatus, an on-demand torque transfer device, a lock-out clutch and a shift mechanism that are cooperatively associated for establishing an On-Demand high-range drive mode, a Neutral non-driven mode, and a Four-Wheel low-range drive mode. Optionally, a Four-Wheel high-range drive mode and/or an On-Demand low-range drive mode are also available.

BRIEF DESCRIPTION OF THE DRAWINGS

Further objects, features, and advantages of the present invention will become apparent from analysis of the following written specification, the accompanying drawings, and the appended claims in which:

DETAILED DESCRIPTION OF THE PREFERRED EMBODIMENTS

In general, the present invention is directed to a transfer case for use in four-wheel drive vehicles which is equipped with a constant velocity (CV) type universal joint for angling the transfer case input relative to its outputs so as to reduce the departure angles of the front and rear drivelines relative thereto. The reduced driveline angles facilitate the use of less expensive single cardan joints at the transfer case outputs in substitution for the traditional, more expensive, double cardan variety. The following written disclosure, when taken in conjunction with the drawings and claims, is intended to describe the best mode known to the inventors for making the inventive concepts claimed.

Figure 1:
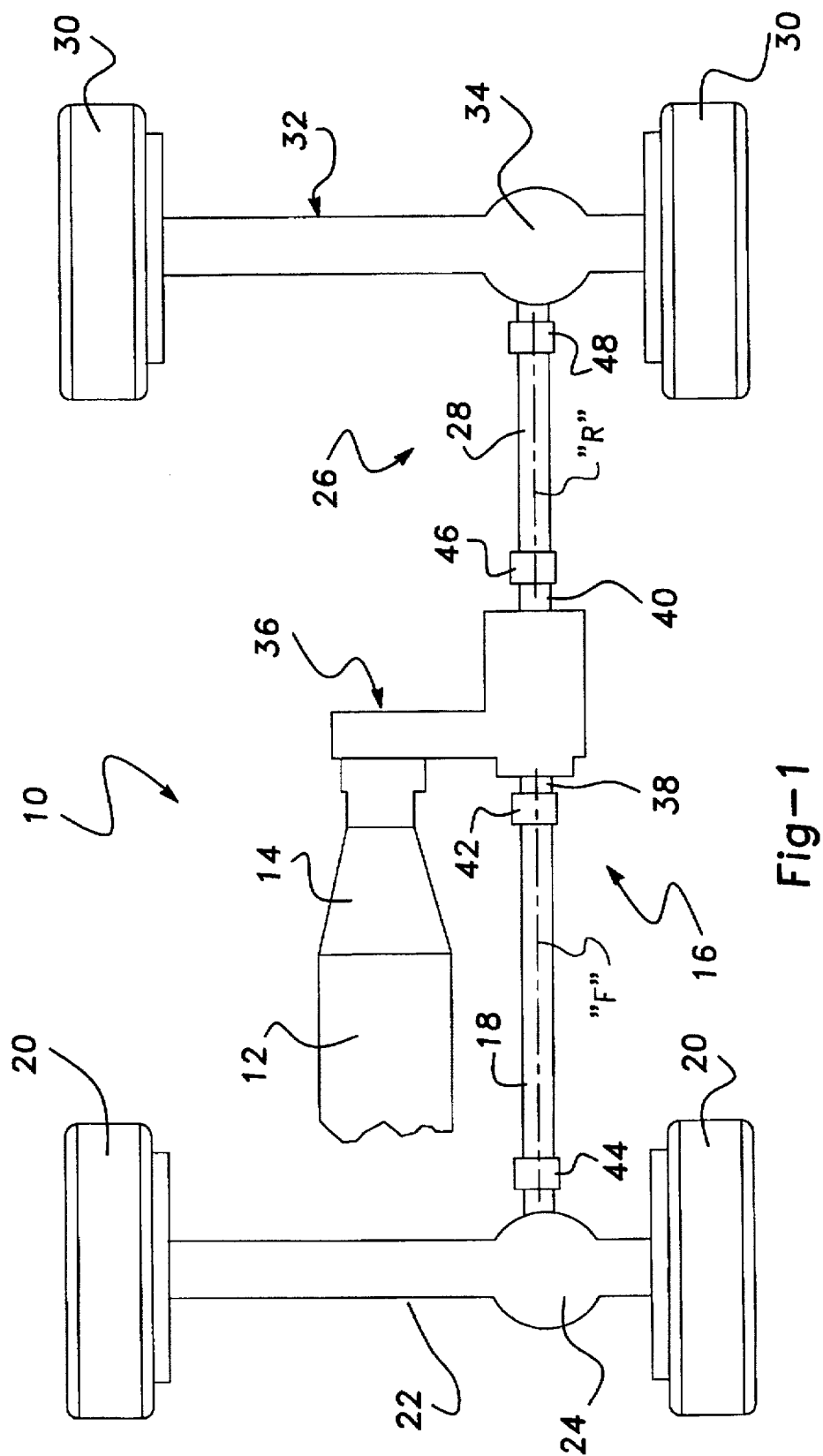
FIG. 1 is a top plan view of a power transfer system for a four-wheel drive motor vehicle utilizing the double offset transfer case of the present invention for connecting the drivetrain to the front and rear drivelines.
Figure 2:
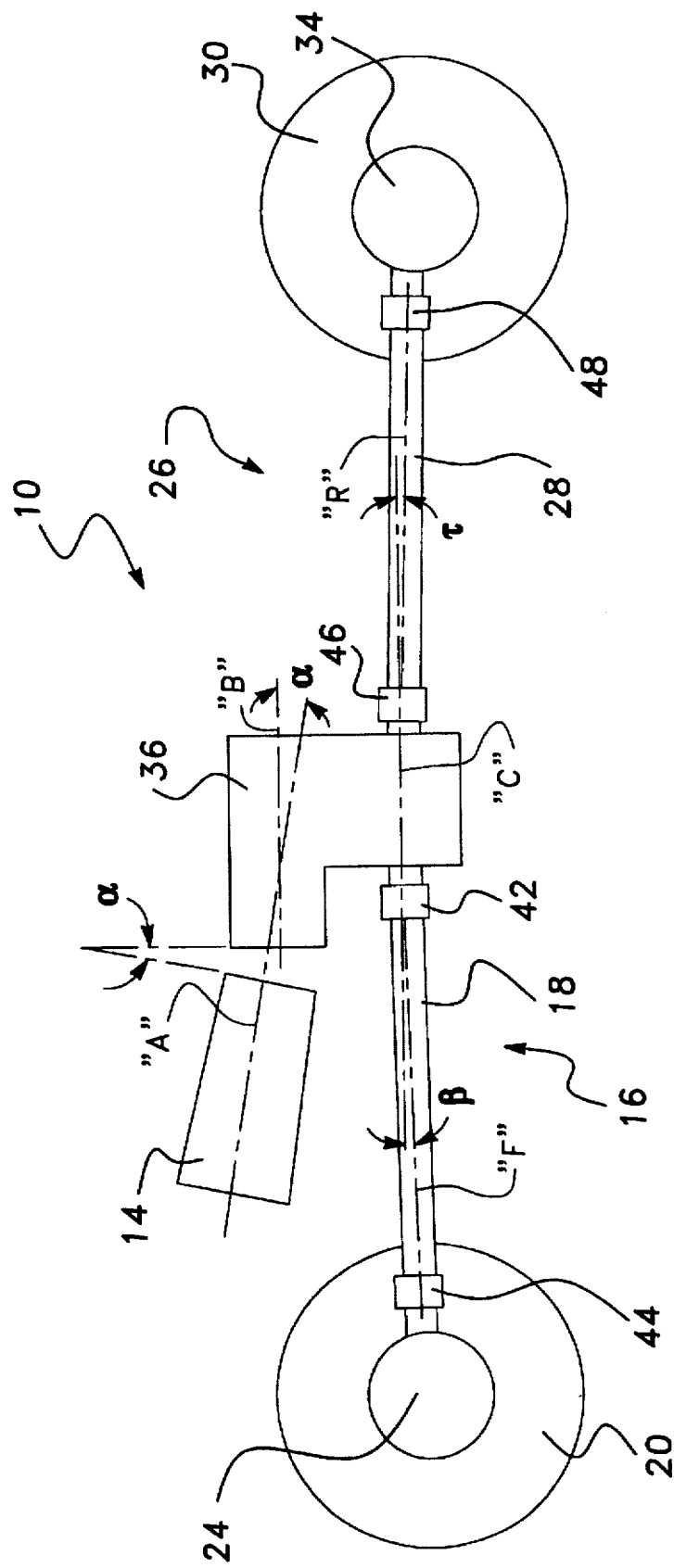
FIG. 2 is a side view of FIG. 1, illustrating the angular relations between the input of the transfer case and the output of the drivetrain as well as the angular relationship between the front and rear drivelines and the transfer case outputs.

Referring to FIGS. 1 and 2 of the drawings, a power transfer system for a four-wheel drive vehicle is shown which incorporates the novel principles and features of the present invention. The vehicle includes a drivetrain 10 defined schematically by an engine 12 and a transmission 14. The vehicle also includes a front driveline 16 defined by a front prop shaft 18 that is interconnected to a pair of front wheels 20 via a front axle assembly 22 including a front differential 24. As seen, front prop shaft 18 is adapted to rotate about an axis, denoted by reference letter "F". A rear driveline 26 is defined by a rear prop shaft 28 that is interconnected to a pair of rear wheels 30 via a rear axle assembly 32 including a rear differential 34. Likewise, rear prop shaft 28 is adapted to rotate about an axis, denoted by reference letter "R". Drivetrain 10 is coupled to front driveline 16 and rear driveline 26 via a power transfer apparatus, hereinafter referred to as transfer case 36. As will be discussed with greater specificity hereinafter, transfer case 36 has an input 37 that is driven by the output of transmission 14, a front output shaft 38, a rear output shaft 40, and a torque transfer arrangement 41 for selectively transferring drive torque from input 37 to outputs 38 and 40. Front output shaft 38 is connected to the rearward end of front prop shaft 18 via a conventional single cardan universal joint 42. Similarly, the forward end of front prop shaft 18 is connected to front differential 24 by means of a single cardan universal joint 44. Likewise, rear output shaft 40 is connected to a forward end of rear prop shaft 28 via a single cardan universal joint 46 while the rearward end of rear prop shaft 28 is connected to rear differential 34 by means of a single cardan universal joint 48.

Figure 3:
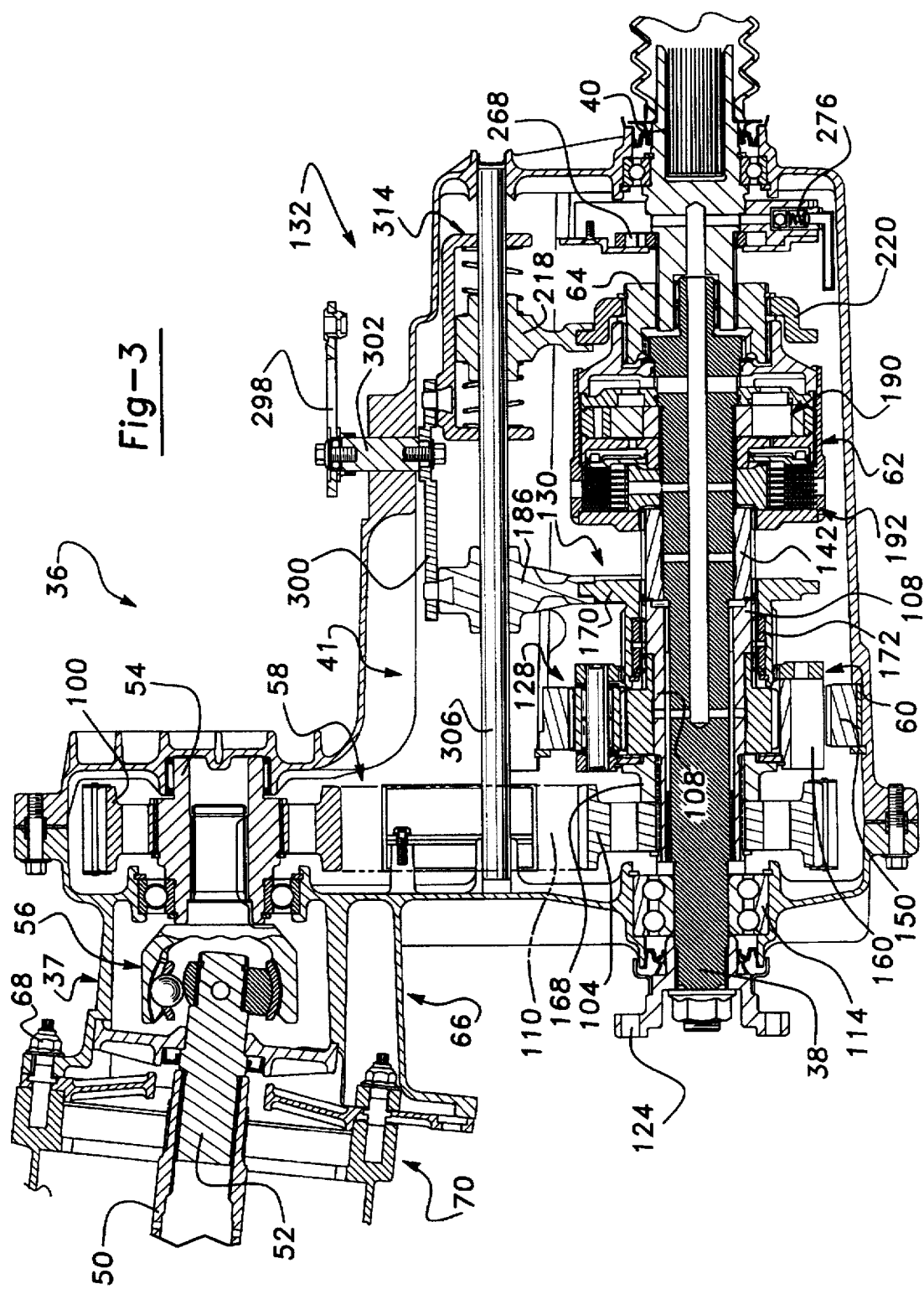
FIG. 3 is a section view of the double offset transfer case of the present invention.
Figure 4:
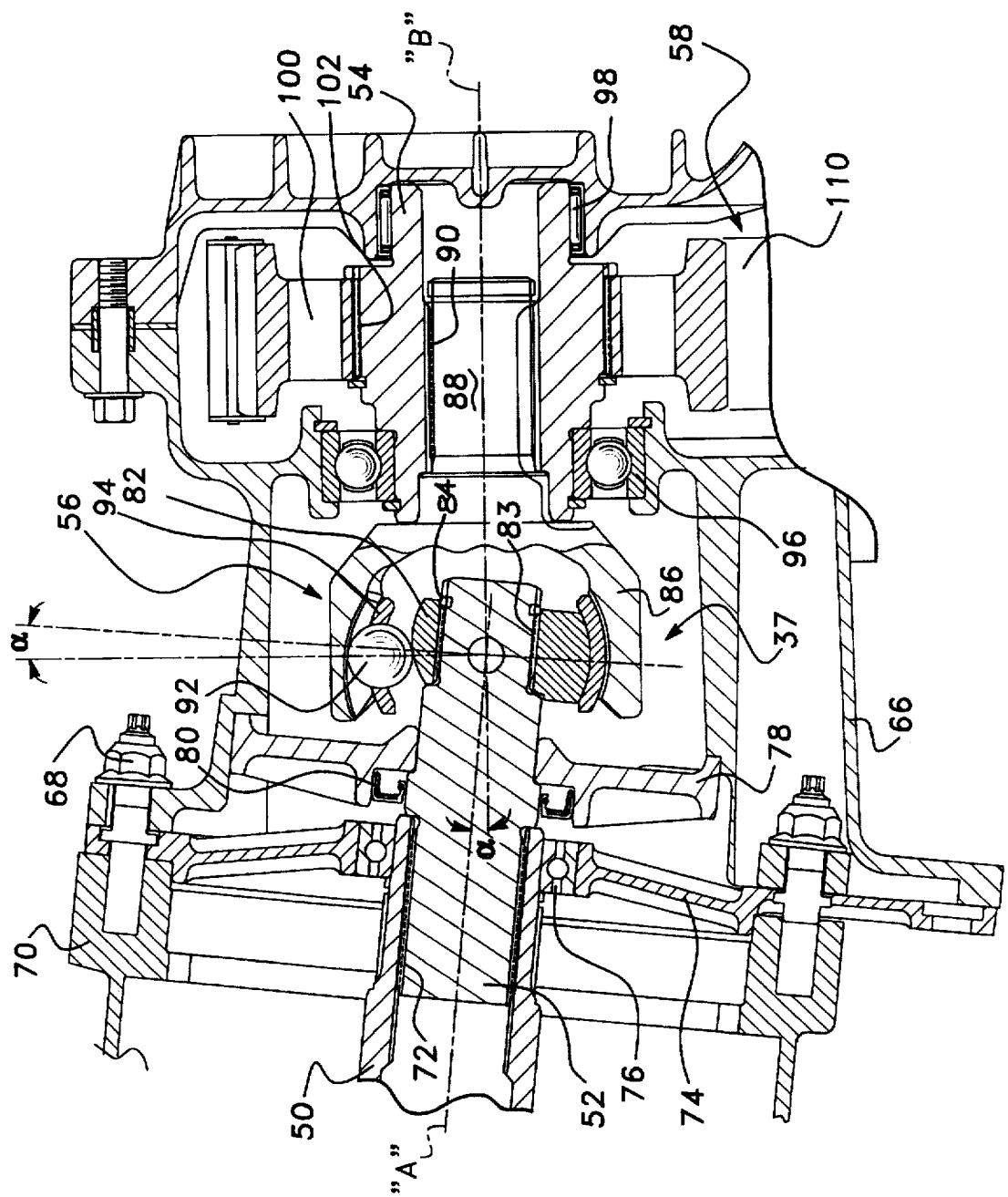
FIG. 4 is an enlarged partial view of FIG. 3 showing the integration of a CV joint into the input section of the transfer case in greater detail.

As best seen from FIGS. 2 and 3, transmission 14 includes an output shaft 50 that is connected to input 37 of transfer case 36. Input 37 includes a first rotary input member or input shaft 52 that is angularly interconnected to a second rotary input member or drive shaft 54 via a constant velocity (CV) universal joint 56. As seen, input shaft 52 is supported for rotation about a first axis of rotation, denoted by reference letter "A". Moreover, drive shaft 54 is supported within transfer case 36 for rotation about a second axis of rotation, denoted by reference letter "B". Rear output shaft 40 is supported for rotation about a third axis of rotation, denoted by reference letter "C". Moreover, front output shaft 38 is supported for rotation relative to rear output shaft 40 and is commonly aligned to rotate about third axis "C". Thus, transfer case 36 is of the "double offset" variety providing a lateral offset between its input and both of its outputs. As will be detailed, drive torque is selectively transmitted from drive shaft 54 to output shafts 38 and 40 through torque transfer arrangement 41 which includes a drive connection 58, a two-speed reduction apparatus 60, an on-demand torque transfer device 62, and a lock-out clutch 64.

Rotary axis "A" of transmission output shaft 50 and transfer case input shaft 52 is vertically coplanar with rotary axis "B" of drive shaft 54. Preferably, front axis "F" and rear axis "R" are both vertically coplanar with rotary axis "C" of transfer case output shafts 38, 40. From FIGS. 2 and 3, it is shown that the rotary axis "B" of drive shaft 54 intersects the rotary axis "A" of input shaft 52 at an input angle, denoted by (α). This angular relationship, permitted via CV joint 56, essentially tips transfer case 36 such that the front departure angle, denoted by (β), between rotary axis "F" of front prop shaft 18 and rotary axis "C" of front output shaft 38 can be substantially reduced. Similarly, this angulated input arrangement provides a reduction in the rear departure angle, denoted by (γ), between rotary axis "R" of rear prop shaft 28 and rotary axis "C" of rear output shaft 40. According to one driveline application now contemplated, an input angle (α) of about five degrees results in departure angles (β) and (γ) of less than two degrees. As noted, such reduced departure angles facilitate the use of less costly universal joints and provide a significant advantage over prior art systems. Obviously, the particular input and departure angles selected will depend on each specific transfer case and driveline application.

With particular attention now drawn to FIGS. 3 through 8, the various components of transfer case 36 will now be described with greater specificity. Transfer case 36 includes a housing 66 that is secured via bolts 68 to transmission housing 70. A splined connection 72 couples transmission output shaft 50 to one end of input shaft 52. Transmission output shaft 50 is shown supported relative to housing 66 via an apertured cover plate 74 and a suitable bearing assembly 76. Likewise, input shaft 52 is shown supported for rotation in housing 66 via an apertured support plate 78 and a suitable seal 80. An inner race 82 of a Rzeppa-type CV joint 56 is fixed via splined connection 83 to the stepped opposite end of input shaft 52 and retained thereon via a retaining ring 84. An outer race 86 surrounds inner race 82 and has an integral stub shaft 88 that is coupled via a splined connection 90 to drive shaft 54. A plurality of balls 92, entrapped by a cage 94, are disposed between and in contact with the arcuate facing surfaces of inner race 82 and outer race 86. It is contemplated that any suitable type and size of CV joint can be used for providing the angular connection at the input of transfer case 36.

Drive shaft 54 is supported from housing 66 by a pair of axially-spaced bearing assemblies 96 and 98 for rotation about the "B" rotary axis. Drive connection 58 includes a drive sprocket 100 that is fixed via a splined connection 102 to the outer periphery of drive shaft 54 for common rotation therewith. Drive connection 58 also includes a driven sprocket 104 that is fixed via a splined connection 106 for common rotation with an elongated tubular quill shaft 108. A drive chain 110, shown in phantom, interconnects driven sprocket 106 to drive sprocket 100. Quill shaft 108 concentrically surrounds a portion of front output shaft 38 and is supported thereon for relative rotation via suitable bearing assemblies 112 and 113. Moreover, one end of front output shaft 38 is supported from housing 66 via a suitable bearing assembly 114 while its opposite end is piloted in a bore 116 formed in one end of rear output shaft 40 and supported therein via a suitable bearing assembly 118. The opposite end of rear output shaft 40 extends out of housing 66 and is supported therefrom via bearing assembly 120. The portion of rear output shaft 40 which extends beyond housing 66 includes an internally-splined bore 122 adapted to receive the externally-splined yoke 123 of universal joint 46. Similarly, the portion of front output shaft 38 extending out of housing 66 includes a yoke 124 adapted for connection to a mating portion of universal joint 42.

Figure 5:
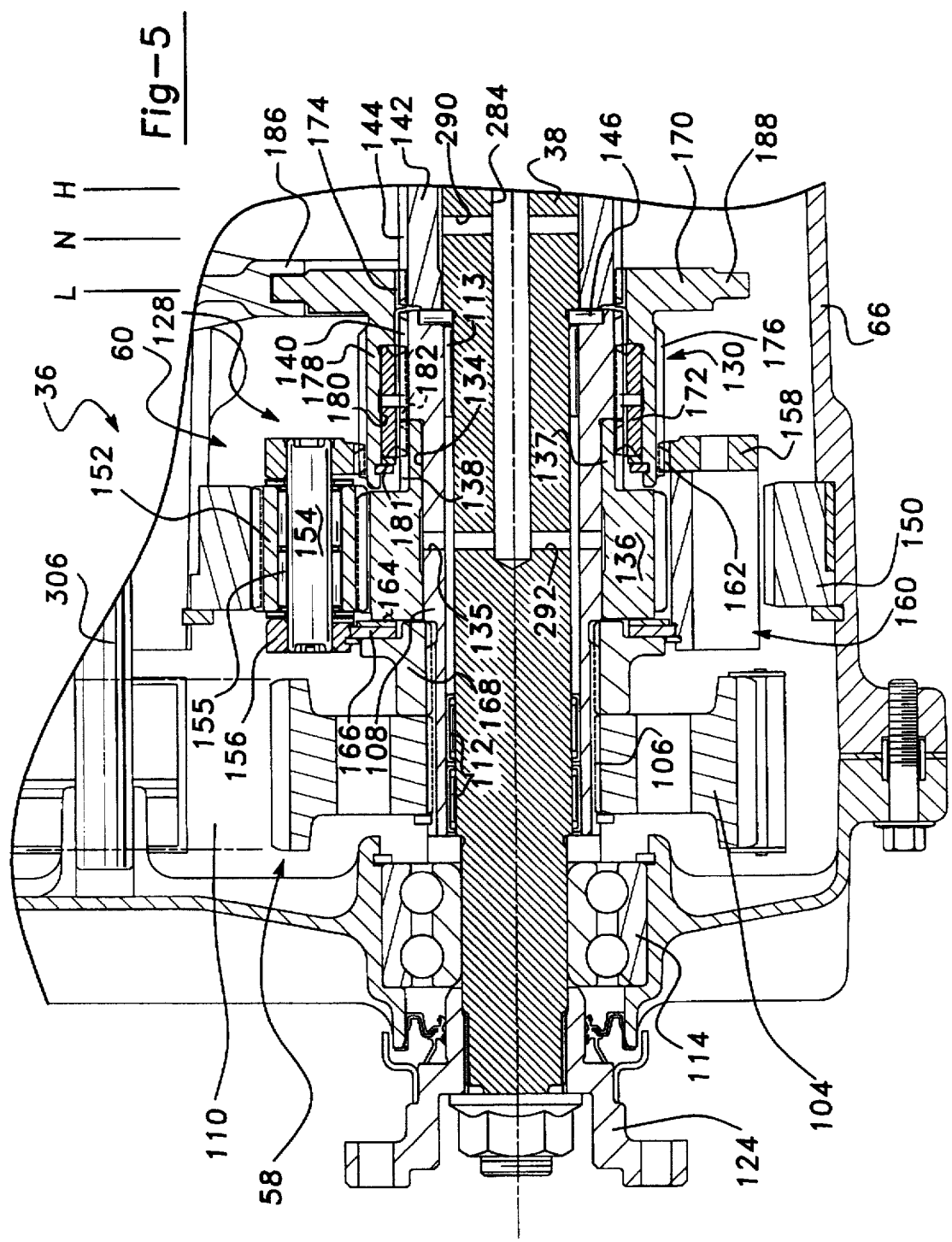
FIG. 5 is another enlarged partial view of FIG. 3 showing the two-speed reduction apparatus in greater detail.

Referring particularly to FIGS. 3 and 5, two-speed reduction apparatus 60 is shown to include a planetary gear assembly 128 and a range clutch 130. Planetary gear assembly 128 is selectively driven by quill shaft 108 via axial movement of range clutch 130 in response to actuation of a shift mechanism 132 for establishing a high-speed and a low-speed drive connection and a non-driven condition with a drive hub 142. Quill shaft 108 has an external bearing surface 134 on which a sun gear 136 is journally supported. Radial ports 135 in quill shaft provide a lubrication flow path to bearing surface 134. Sun gear 136 includes an integral axial extension 137 on which external clutch teeth 138 are formed. In addition, clutch teeth 140 are formed on an annular end portion of quill shaft 108 such that clutch teeth 140 are located adjacent to, and are alignable with, sun gear clutch teeth 138. Drive hub 142 is journally supported on front output shaft 38 and has external clutch teeth 144 which are located adjacent to, and are alignable with, quill shaft clutch teeth 140. A radial bearing assembly 146 is disposed between drive hub 142 and quill shaft 108 to facilitate relative rotation therebetween.

Planetary gear assembly 128 also includes a ring gear 150 that is fixed to housing 66 so as to be held stationary relative thereto. A plurality of pinion gears 152 (only one shown) are each rotatably supported on a pin 154 via a bearing assembly 155. Each pin 154 extends between fore and aft carrier rings 156 and 158, respectively, which, combined with pins 154 and pinion gears 152, define a planet carrier 160. Pinion gears 152 mesh with sun gear 136 and ring gear 150. Internal clutch teeth 162 are formed on aft carrier ring 158. A suitable thrust washer 164 separates sun gear 136 from a retaining ring 166 that is fixed to front carrier ring 156 and which rotates relative to a spacer hub 168 that is splined to quill shaft 108 for axially locating sun gear 136 relative to driven sprocket 104.

As best seen from FIG. 5, range clutch 130 includes a pair of sleeves 170 and 172 that are selectively engageable with one or more of sun gear 136, quill shaft 108 and drive hub 142 for establishing the two different speed drive connections and the non-driven condition between quill shaft 108 and drive hub 142. In particular, outer sleeve 170 has internal clutch teeth 174 which constantly engage external clutch teeth 144 of drive hub 142. Likewise, outer sleeve 170 has external clutch teeth 176 formed on a drum-like axial extension 178 that are selectively engageable with internal clutch teeth 162 on aft carrier ring 158. Inner sleeve 172 is rotatably supported against an inner recessed bearing surface 180 of outer sleeve extension 178 and retained relative thereto by a snap ring 181. Inner sleeve 172 includes internal clutch teeth 182 that continuously mesh with external clutch teeth 140 of quill shaft 108 and which are also selectively engageable with either sun gear clutch teeth 138 or drive hub clutch teeth 144 depending on the axial position of range clutch 130. A shift fork 186 entraps a radial extension 188 of outer sleeve 170 and is selectively operable to move range clutch 130 between positions L, N, and H which respectively represent a Low-Range drive connection, a Neutral non-driven condition and a High-Range drive connection. Range clutch 130 is shown positioned in the L position whereat clutch teeth 182 of inner sleeve 172 engages both sun gear clutch teeth 138 and quill shaft clutch teeth 140 while external clutch teeth 176 on outer sleeve 170 engage carrier clutch teeth 162 and internal clutch teeth 174 on outer sleeve 170 engage drive hub clutch teeth 144. As such, inner sleeve 172 couples sun gear 136 for common rotation with quill shaft 108. Thus, sun gear 136 acts as the input member of planetary gear assembly 128 for driving pinion gears 152 around ring gear 150 such that planet carrier 160 is driven at a reduced or underdrive speed ratio relative to quill shaft 108. Moreover, due to the connection of planet carrier 160 to drive hub 142 via outer sleeve 170 of range clutch 130, drive hub 142 is also driven at the reduced ratio speed relative to quill shaft 108 for establishing the Low-Range drive connection therebetween.

When range clutch 130 is moved rightward to the N position, clutch teeth 182 of inner sleeve 172 are decoupled from sun gear teeth 138 and thus only engage quill shaft clutch teeth 140. Moreover, clutch teeth 176 of outer sleeve 170 are uncoupled from planet carrier teeth 162 and clutch teeth 174 of outer sleeve 170 only engage drive hub clutch teeth 144. Since inner sleeve 172 is free to rotate relative to outer sleeve 170, there is no driven connection between quill shaft 108 and drive hub 142 through planetary gear assembly 128 so as to establish the Neutral non-driven condition. When range clutch 130 is moved farther to the right to its H position, a direct connection is established between quill shaft 108 and drive hub 142. In particular, in the H position, outer sleeve 170 is uncoupled from planet carrier 160 and its internal clutch teeth 174 are engaged with drive hub clutch teeth 144. In addition, clutch teeth 182 of inner sleeve 172 meshingly engage both quill shaft clutch teeth 140 and drive hub clutch teeth 144. Thus, range clutch 130 directly couples drive hub 142 to quill shaft 108 for establishing the High-Range drive connection. An advantageous feature of planetary gear assembly 128 is that sun gear 136 is disconnected from driven connection to quill shaft 108 when the High-Range drive connection is established. As such, planetary gear assembly 128 remains stationary during High-Range drive operation.

Figure 6:
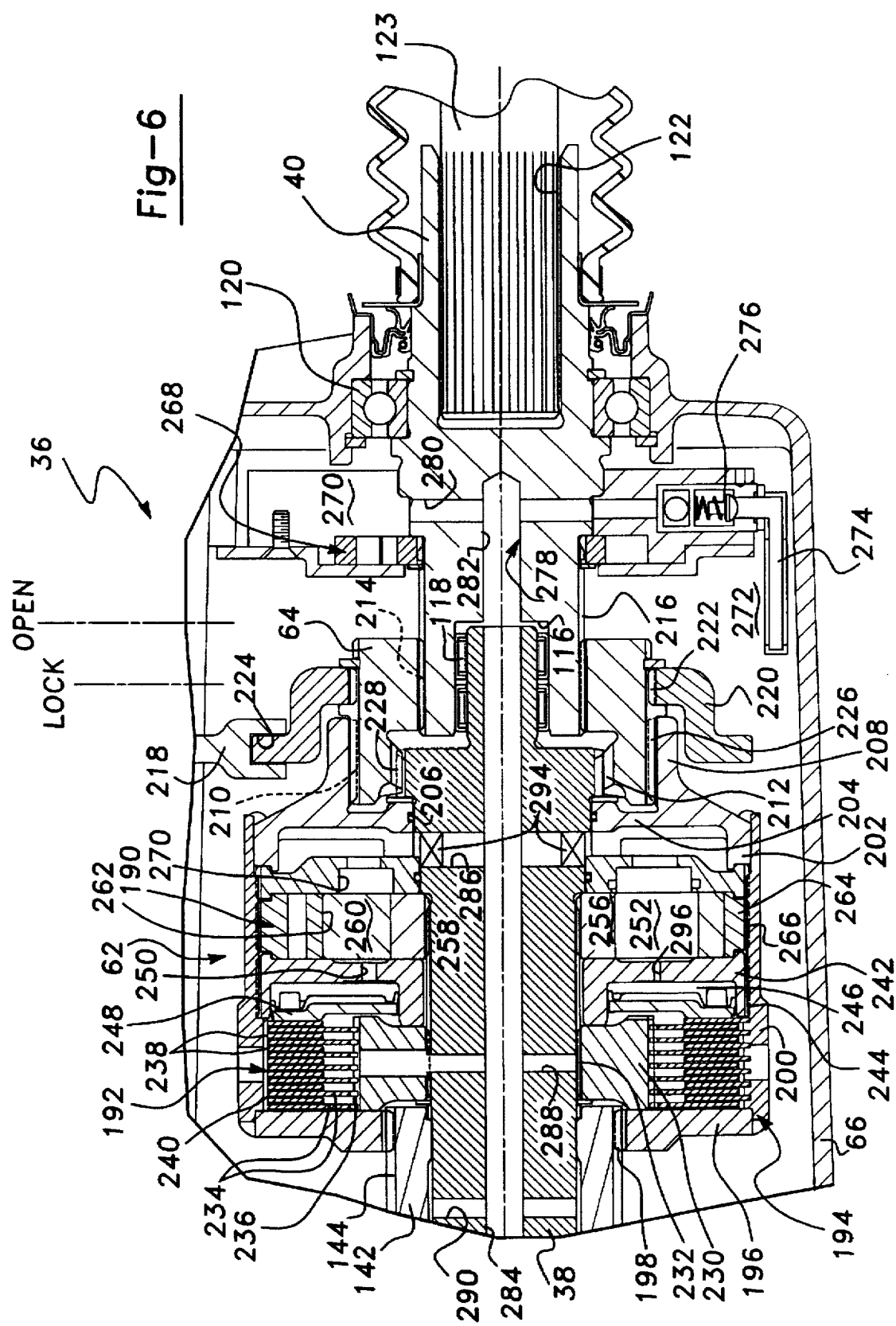
FIG. 6 is also an enlarged partial view of FIG. 3 showing the on-demand torque transfer device and lock-out clutch in greater detail.

Referring now to FIG. 6, on-demand torque transfer device 62 will be described in greater detail. However, prior to such disclosure, it should be noted that any device capable of transferring torque from one shaft to another in response to a speed differential therebetween is to be considered an equivalent device within the true spirit of this invention. Such equivalent devices include, but are not limited to, viscous couplings, geared couplings, electronically-controlled friction clutches and the like.

Torque transfer device 62 is, in the preferred construction, a hydraulic coupling utilizing the speed-sensitive pumping action of a gerotor pump 190 for applying a fluid pressure to the interleaved clutch pack of a clutch assembly 192. The hydraulic coupling includes a housing assembly 194 which connects drive hub 142 to lock-out clutch 64 which, in turn, is coupled to rear output shaft 40. Housing assembly 194 includes a front cover plate 196 fixed by a splined connection 198 to clutch teeth 144 of drive hub 142, a cylindrical drum 200 fixed (i.e., welded) at one end to front cover 196, and a rear cover plate 202 fixed (i.e., welded) to the opposite end of drum 200. Rear cover plate 202 has a radial disc-like segment 204 extending between drum 200 and front output shaft 38 and which is sealed relative thereto via an o-ring seal 206. Rear cover plate 202 also includes an axial segment 208 having internal clutch teeth 210 formed thereon. External clutch teeth 212 are provided on the rearward end of front output shaft 38 in generally facing relation to internal clutch teeth 210 on rear cover plate 202. Lock-out clutch 64 has internal splines 214 that are constantly engaged with external splines 216 of rear output shaft 40 such that lock-out clutch 64 is supported for rotation with and axial sliding movement on rear output shaft 40 between an "Open" position and a "Lock" position in response to movement of a second shift fork 218 caused by actuation of shift mechanism 132. An annular fork plate 220 is fixed via splined connection 222 to lock-out clutch 64 and is entrapped within a groove 224 of second shift fork 212. As will be detailed, shift mechanism 132 causes coordinated movement of shift forks 186 and 218 for establishing the various available drive modes.

As shown in FIG. 6, lock-out clutch 64 is in its "Lock" position whereat its external clutch teeth 226 are meshed with internal clutch teeth 210 of rear cover plate 202 and its internal clutch teeth 228 are meshed with external clutch teeth 212 of front output shaft 38. In this position, lock-out clutch 64 establishes a direct coupling between drive hub 142 (via housing assembly 194) and both rear output shaft 40 and front output shaft 38. Thus, drive torque is transferred equally to front and rear output shafts 38 and 40. When lock-out clutch 64 is moved to its "Open" position, it is uncoupled from direct engagement with front output shaft 38 such that drive torque is only transferred from drive hub 142 through housing assembly 194 and lock-out clutch 64 to rear output shaft 40. Specifically, internal clutch teeth 228 of lock-out clutch 64 are de-coupled from external clutch teeth 212 of front output shaft while its external clutch teeth 226 remain meshed with internal clutch teeth 210 on rear cover plate 202. Thus, any drive torque to be transferred from drive hub 142 to front output shaft 38 must be provided "on-demand" from torque transfer device 62.

With continued reference to FIG. 6, clutch assembly 192 of torque transfer device 62 is also shown to include a hub 230 fixed via a splined connection 232 to front output shaft 38. A plurality of inner clutch plates 234 are fixed via a splined connection 236 to the outer periphery of hub 230. A plurality of outer clutch plates 238 are fixed via a splined connection 240 to outer drum 200 and are alternatively interleaved with inner clutch plates 234. Located adjacent to hub 230 is a piston housing 242 that is fixed via a splined connection 244 to outer drum 200. Piston housing 242 is generally cup-shaped so as to define a pressurized piston chamber 246 within which a piston assembly 248 is disposed for sliding movement relative to the interleaved clutch plates 234 and 238. A series of flow passages 250 (one shown) extend through piston housing 242 to provide a fluid communication pathway between piston chamber 246 and an inlet chamber 252.

Gerotor pump 190 is provided for generating a fluid pressure in piston chamber 246 in proportion to a speed differential between front output shaft 38 and rear output shaft 40. Gerotor pump 190 includes a inner rotor 256 fixed via a splined connection 258 to front output shaft 38 and which has a plurality of external teeth or lobes. An outer rotor 260 is supported for eccentric rotation relative to inner rotor 256 and has a plurality of internal teeth or lobes meshed with the external lobes of inner rotor 256. The eccentric path of outer rotor 260 is established by the eccentric bearing surface 262 of an eccentric ring 264 that is fixed via a splined connection 266 to outer drum 200. Preferably, the number of lobes on outer rotor 260 is one greater than the number of lobes on inner rotor 256 such that relative rotation therebetween causing a speed-dependent pumping action for pressurizing piston chamber 246.

A lubrication system is provided within housing 66 and includes a gerotor-type lube pump 268 confined within an enclosed pump chamber 270 and which is operable to draw fluid from a sump area 272 into an inlet conduit 274 and through a one-way flow valve 276 for delivery to a central flow passage 278 via a series of radial inlet ports 280. Central flow passage 278 includes a longitudinal bore 282 in rear output shaft 40 and a commonly-aligned longitudinal bore 284 in front output shaft 38. Rotation of rear output shaft 40 causes lube pump 268 to draw fluid into the central flow passage 278 while one-way flow valve 276 inhibits its return to sump area 272 for maintaining a prime in pump chamber 270. A series of radial ports 286, 288 and 290 are formed in front output shaft 38 for delivering lubricant from central flow passage 278 to inlet chamber 252, clutch hub 230 and drive hub 142, respectively. Likewise, radial ports 292 provide lubrication to quill shaft 108 and sun gear 136. One-way flow valves 294 are installed in radial ports 286 for maintaining an adequate prime of fluid in inlet chamber 252 of gerotor pump 190.

As will be understood, the fluid pressure generated by gerotor pump 190 in response to relative rotation between inner rotor 256 and outer rotor 260 is supplied to piston chamber 246 whereat the fluid pressure acts on piston assembly 248 for causing it to exert a clamping force on the interleaved clutch plates. Preferably, the fluid pressure supplied to piston chamber 246 is a function of, or is directly proportional to, the speed differential between rear output shaft (and outer rotor 260) and front output shaft 38 (and inner rotor 256). Thus, clutch assembly 192 transfers drive torque automatically or "on-demand" from housing assembly 192 to hub 230 and, in turn, to front output shaft 38. The amount of torque transferred is, preferably, proportional to the clamping force exerted on the clutch pack of clutch assembly 192 which is proportional to the fluid pressure delivered by gerotor pump 190 to piston chamber 246. Directional flow control valving (not shown) is preferably installed in each flow passage 250 such that the direction of relative rotation dictates the direction of flow into piston chamber 246. Relief valving may also be installed in bleed passages 296 for permitting low speed differentials (i.e., during a vehicle turning condition) without generating a significant torque transfer condition. The torque versus speed differential characteristics of torque transfer device 62 are "tunable", that is, such characteristics can be preselected and accomplished by the particular design of the device. As such, torque transfer may be defined as a function of the speed differential (i.e., "slip") between outputs 38 and 40. A more thorough discussion of the hydraulic coupling is disclosed in U.S. Pat. No. 5,310,388 to Okcuoglu et al., the entire disclosure of which is incorporated by reference herein.

Figure 7:
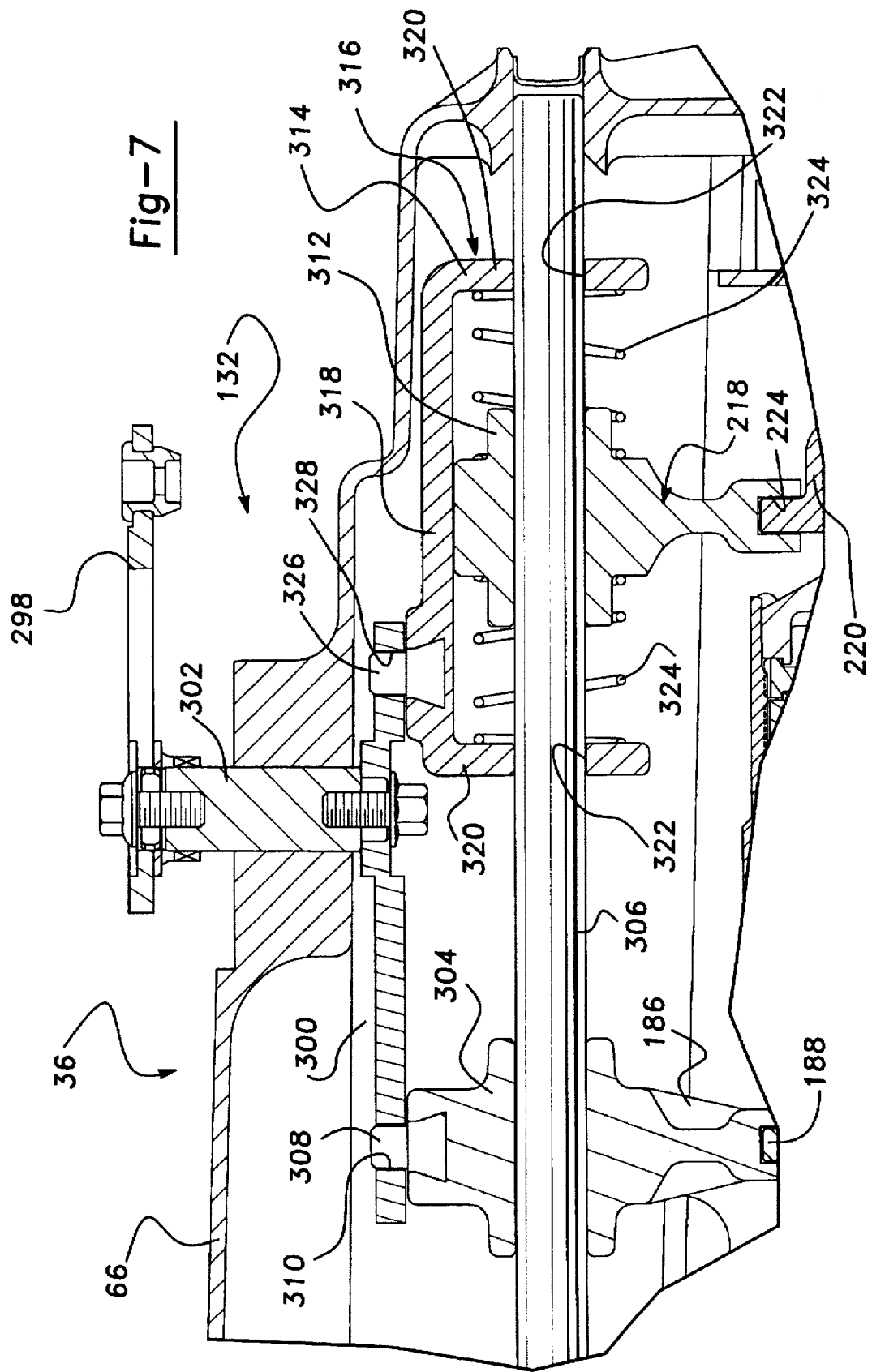
FIG. 7 is yet another enlarged partial view of FIG. 3 showing the manually-actuated shift mechanism provided for shifting the transfer case into various drive modes.
Figure 8:
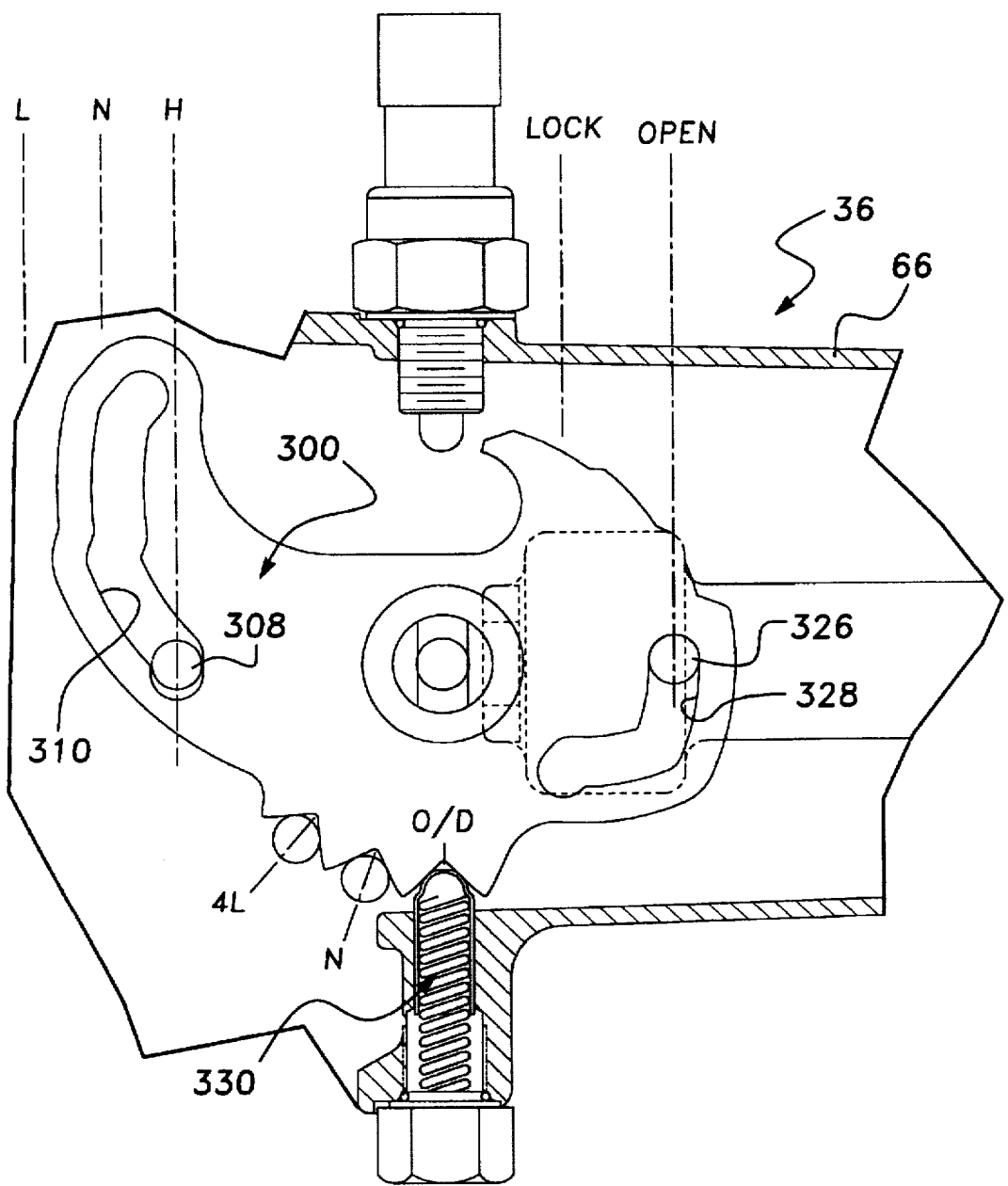
FIG. 8 is a side view of the sector plate shown in FIG. 7 that is rotatably driven by the shift mechanism for controlling actuation of the two-speed reduction apparatus and the lock-out clutch.

Referring now to FIGS. 7 and 8, the various components associated with shift mechanism 132 for controlling coordinated movement of range clutch 130 and lock-out clutch 64 are shown with greater specificity. According to the construction shown, shift mechanism 132 is adapted to be coupled via conventional linkages to a manually-operable shift lever that is located within the passenger compartment of the motor vehicle and which is operable for permitting the vehicle operator to select operation of transfer case 36 in one of the available drive modes. In general, shift mechanism 132 includes a pivotable lever 298 that is coupled to a sector plate 300 via an actuator shaft 302. Shift forks 186 and 218 are each coupled to sector plate 300 via a follower pin and guide slot arrangement for changing the rotary output (i.e., torque) of lever 298 and sector plate 300 into axially-directed forces capable of moving range clutch 130 and lock-out clutch 64. In particular, shift fork 186 includes a tubular section 304 that is slidingly supported on a shaft 306 mounted to housing 66. A follower pin 308 is fixed to shift fork 186 and is confined within a range slot 310 formed in sector plate 300. The contour of range slot 310 is such that rotation of sector plate 300 in a first direction will shift range clutch 130 from the L position, through the N position, and into the H position. Obviously, reverse rotation of sector plate 300 results in the movement of range clutch 130 through the positions in opposite order.

Shift fork 218 is similar to shift fork 186 and likewise includes a tubular section 312 that is slidingly supported on shaft 306. A spring-biasing mechanism 314 is provided for applying a biasing load on shift fork 218 for assisting in completing engagement of lock-out clutch 64 with clutch teeth 212 on front output shaft 38 upon movement to its "Lock" position. Spring-biasing mechanism 314 is adapted to provide a self-centering biasing load on lock-out clutch 64 to ensure lock-up after completion of the movement of sector plate 300 in those conditions where slight speed differences create blockage of clutch teeth 228 on lock-out clutch 64 from passing into engagement with clutch teeth 212 on front output shaft 38 until the blockage is eliminated. To this end, an angled bracket 316 is provided which has a leg section 318 and two bent arm sections 320 extending therefrom. Apertures 322 are formed in arm sections 320 through which shaft 306 extend. A pair of biasing springs 324 act between each arm section 320 and shift fork 218 for normally centering shift 218 fork in a balanced equilibrium condition. A follower pin 326 is fixed to leg section 318 of bracket 316 and is disposed within a mode slot 328 formed in sector plate 300. The contour of mode slot 328 is engineered to produce axial sliding movement of lock-out clutch 64. Thus, the contour of mode slot 328 and range slot 310 are designed to cause coordinated movement of lock-out clutch 64 and range clutch 130 in response to rotation of sector plate 300 for establishing each of the available drive modes.

According to the particular embodiment disclosed, sector plate 300 is designed to coordinate movement of range clutch 130 and lock-out clutch 64 to establish at least three different operational modes. These modes include an On-Demand high-range drive mode, a Neutral mode, and a Four-Wheel low-range drive mode. In the On-Demand high-range drive mode, range clutch 130 is located in its H position and lock-out clutch 64 is located in its "Open" position. In the Neutral mode, range clutch 130 is located in its N position and lock-out clutch is maintained in its "Open" position. Finally, in the Four-Wheel low-range drive mode, range clutch 130 is located in its L position and lock-out clutch 64 is located in its "Lock" position. A detent poppet 330 is provided for positively locating sector plate 300 in each of these three different rotated positions as indicated by the O/D (On-Demand high-range), N (Neutral) and 4L (Four-Wheel low-range) positions. It is also contemplated that transfer case 36 could be adapted to provide a Four-Wheel high-range drive mode in addition to the above-noted modes. If such a mode is made available, range clutch 130 would be located in its H position and lock-out clutch 64 would be located in its "Lock" position. Such an additional drive mode simply requires modification to the profiles of range slot 310 and mode slot 328 to provide the desired coordinated movement of lock-out clutch 64 and range clutch 130. As an alternative option, the profiles of range slot 310 and mode slot 328 can be slightly modified to also provide an On-Demand low-range drive mode with range clutch 130 located in its L position and lock-out clutch 64 located in its "Open" position.

Figure 9:
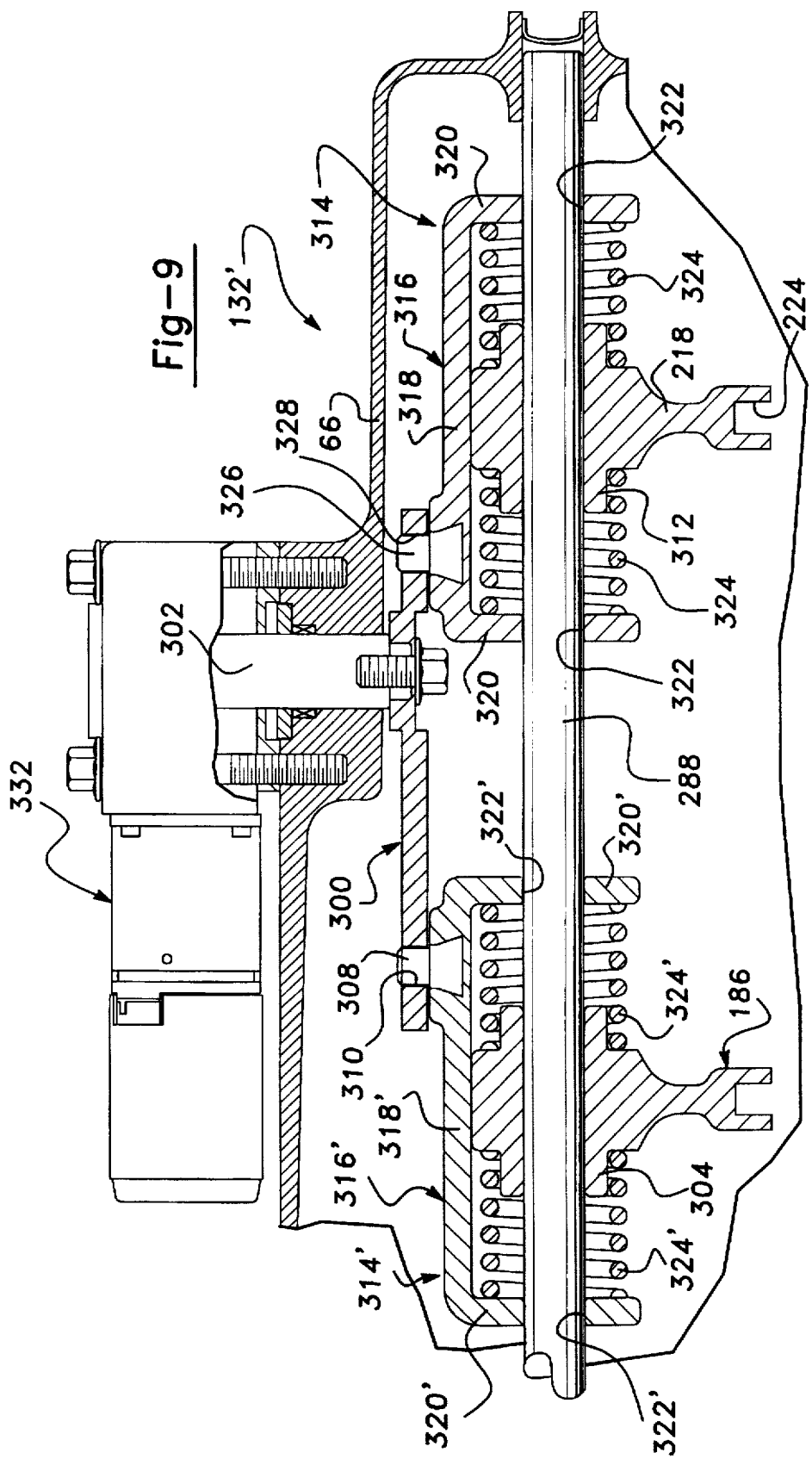
FIG. 9 is a view, similar to FIG. 7, illustrating an electrically-controlled shift mechanism adapted for use with the transfer case of the present invention.

FIG. 9 is a view, similar to FIG. 7, illustrating an alternative shift mechanism 132' used in association with an electrically-controlled shift system wherein the vehicle operator actuates push-button or rotary switches for actuating a rotary-driven actuator. As seen, identical or substantially similar functioning components of shift mechanism 132' that were previously disclosed in association with shift mechanism 132 are identified by the same reference numerals. Preferably, the actuator is an electric gearmotor 332 having a rotary output (not shown) coupled to actuator shaft 302. Thus, gearmotor 332 is adapted to controllably rotate sector plate 300 between its various rotated positions in response to control signals sent to gearmotor 332 from a remote controller unit (not shown). The controller unit generates the control signals in response to the mode signals delivered thereto upon the vehicle operator actuating the selection switches or push-buttons. As is also seen, shift fork 186 is operably associated with a spring-biasing mechanism 314'. As before, spring-biasing mechanism 314' includes an angled bracket 316' having leg 318', arms 320' with apertures 322', and a pair of biasing springs 324'. This arrangement maintains a biasing load on shift fork 186 to ensure movement of range clutch 130 to either of the L and H positions following complete rotation of sector plate 300 by gearmotor 332 to its corresponding position. This arrangement is also adapted to avoid overloading of gearmotor 332 if a blockage condition momentarily inhibits full engagement of range clutch 130 with the clutch teeth on sun gear 136 and aft carrier ring 158. While electrically-controlled shift mechanism 132' is disclosed as utilizing one actuator to move both shift forks, it is to be understood that transfer case 36 could be equipped with a pair of actuators for individually controlling movement of each shift fork.

Figure 10:
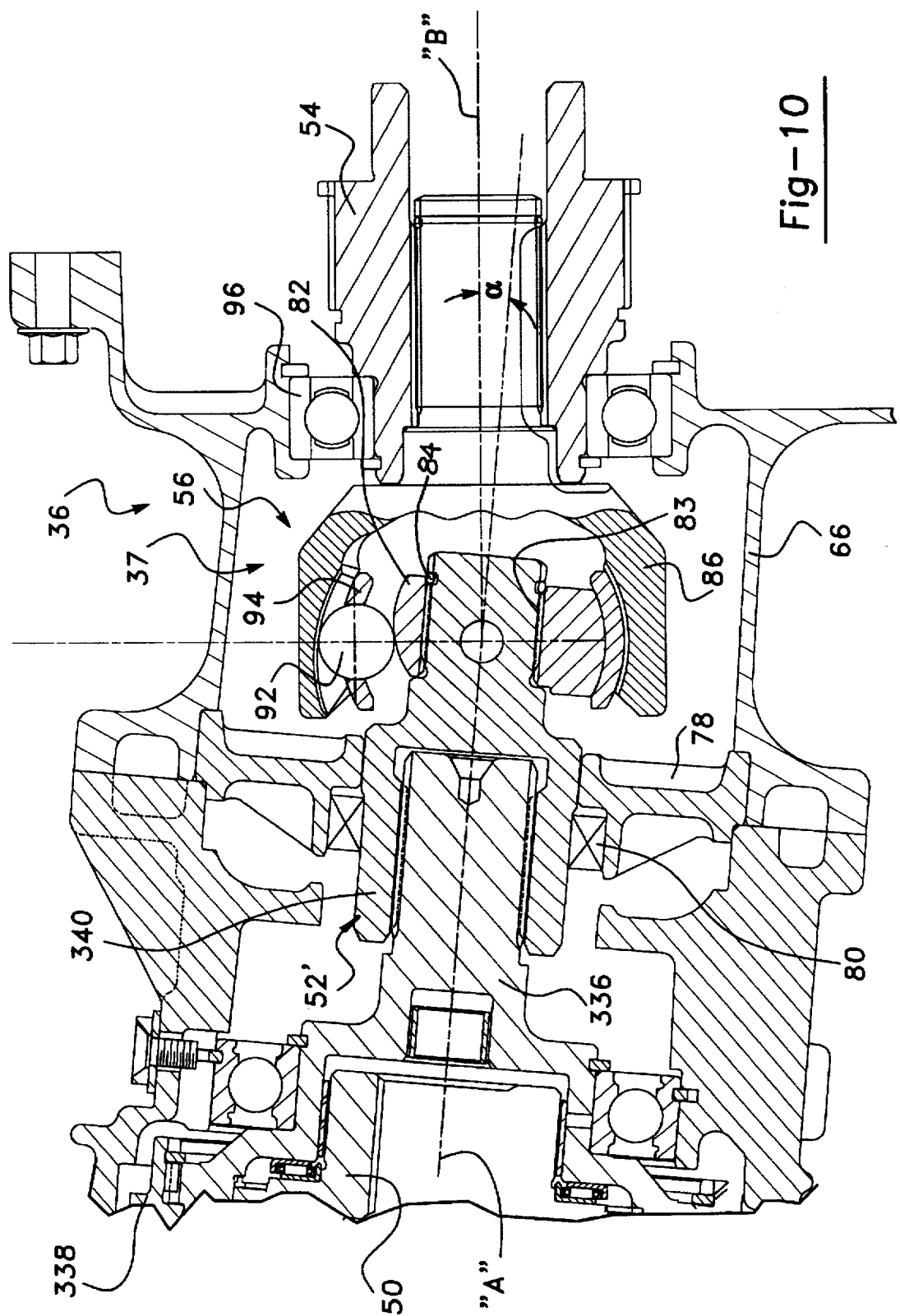
FIG. 10 is a sectional view of an alternative construction for the input section of the transfer case.

The particular input components associated with input 37 of transfer case 36 will be dictated by the specific output components of transmission 14. Thus, while the embodiment disclosed teaches of using an input shaft 52 for coupling transmission output shaft 50 to one rotary component of CV joint 56. various other arrangements are contemplated. For instance, transmission output shaft 50 may be coupled directly to inner race 82 of CV joint 56. A specific alternative example is shown in FIG. 10 wherein an externally-splined output shaft 336 for an add-on overdrive unit 338 is coupled to an internally-splined drum portion 340 of an input shaft 52'. Add-on overdrive unit 338 is operable for providing an additional forward speed ratio for an existing multi-speed automatic transmission by causing its output shaft 336 to be driven at an overdrive speed ratio relative to transmission output shaft 50. Reference can be made to commonly-owned U.S. Pat. No. 4,798,103 to Eastman et al. for details of such an add-on overdrive unit.

The foregoing discussion discloses and describes preferred embodiments of the present invention as contemplated by the inventors to set forth the best mode of carrying out the inventive concepts. One skilled in the art will readily recognize from such discussions, and from the accompanying drawings and claims, that various changes, modifications and variations can be made therein without departing from the true spirit and scope of the invention as defined by the following claims.

What is claimed is:

1. A power transfer apparatus for transferring drive torque from a vehicular drivetrain to first and second drivelines, comprising:

a housing;

an input supported for rotation in said housing, said input including a first input member rotatably driven by the drivetrain about a first rotary axis, a second input member supported for rotation about a second rotary axis that is angled relative to said first rotary axis, and a constant velocity universal joint interconnecting said second rotary member for rotation with said first input member;

an output supported for rotation in said housing, said output including first and second output members respectively interconnected to the first and second drivelines, at least one of said output members being supported for rotation about a third rotary axis that is offset from said second rotary axis; and torque transfer means interconnecting said output to said input for selectively transferring drive torque from said second input member to at least one of said first and second output members.

2. The power transfer apparatus of claim 1 wherein said first and second output members are commonly aligned for relative rotation about said third rotary axis.

3. The power transfer apparatus of claim 1 wherein said torque transfer means includes:

a drive member;

a drive connection interconnecting said drive member for driven rotation with said second input member; and a torque transfer device interconnecting said drive member to said first output member for normally transferring drive torque to the first driveline, said torque transfer device operable in an on-demand four-wheel drive mode for transferring drive torque to said second output member in response to a speed differential between said first and second output members for transferring drive torque to both of the first and second drivelines.

4. The power transfer apparatus of claim 3 further comprising:

a lock-out clutch that is operable in a first position for coupling said second output member to said first output member for establishing a part-time four-wheel drive mode, and in a second position for de-coupling said second output member from said first output member to permit operation of said torque transfer device in said on-demand four-wheel drive mode; and a shift mechanism for moving said lock-out clutch between said first and second positions.

5. The power transfer apparatus of claim 4 further comprising a speed reduction apparatus for establishing a direct-drive high-range speed ratio connection and a reduced low-range speed ratio connection between said second input member and said drive member, and a range clutch that is movable between a high-range position for establishing said high-range connection and a low-range position for establishing said low-range connection, said shift mechanism operable for moving said range clutch between said high-range and low-range positions.

6. The power transfer apparatus of claim 5 wherein said shift mechanism includes movement coordinating means for causing coordinated movement of said range clutch and said lock-out clutch for establishing an on-demand high-range four-wheel drive mode, a part-time high-range four-wheel drive mode and a part-time low-range four-wheel drive mode.

7. The power transfer apparatus of claim 5 wherein said range clutch is movable to a neutral position for disconnecting said drive member from driven connection with said second input member so as to establish a neutral non-driven mode.

8. The power transfer apparatus of claim 3 wherein said first and second output members are commonly aligned for relative rotation about said third rotary axis, said drive member including a drive hub rotatably supported on said second output member, and wherein said torque transfer device includes a housing coupling said drive hub to said first output member, a clutch hub fixed to said second output member, a clutch pack including first and second sets of interleaved clutch plates with said first clutch plates fixed for rotation with said housing and said second clutch plates fixed for rotation with said clutch hub, and actuation means for generating and applying a clutch engagement force on said clutch pack for causing drive torque to be transferred from said housing to said clutch hub in response to a speed differential therebetween.

9. The power transfer apparatus of claim 4 wherein said first and second output members are commonly aligned for relative rotation about said third rotary axis, said drive member including a drive hub rotatably supported on said second output member, and wherein said torque transfer device includes a housing coupled for rotation with said drive hub, a clutch hub fixed to said second output member, a clutch pack including first and second sets of interleaved clutch plates with said first clutch plates fixed for rotation with said housing and said second clutch plates fixed for rotation with said clutch hub, and actuation means for generating and applying a clutch engagement force on said clutch pack for causing drive torque to be transferred from said housing to said clutch hub in response to a speed differential therebetween, and wherein said lock-out clutch couples said first output member for rotation with said housing and is mounted for rotation with and axial movement on said first output member, whereby movement of said lock-out clutch to said first position causes it to couple said second output member to said first output member for inhibiting relative rotation therebetween, and movement of said lock-out clutch to said second position uncouples said first output member from said second output member so as to permit relative rotation therebetween.

10. The power transfer apparatus of claim 5 wherein said first and second output members are commonly aligned for relative rotation about said third rotary axis, said drive member including a drive hub rotatably supported on said second output member, and wherein said torque transfer device includes a housing coupled for rotation with said drive hub, a clutch hub fixed to said second output member, a clutch pack including first and second sets of interleaved clutch plates with said first clutch plates fixed for rotation with said housing and said second clutch plates fixed for rotation with said clutch hub, and actuation means for generating and applying a clutch engagement force on said clutch pack for causing drive torque to be transferred from said housing to said clutch hub in response to a speed differential therebetween, and wherein said lock-out clutch couples said first output member for rotation with said housing and is mounted for rotation with and axial movement on said first output member, whereby movement of said lock-out clutch to said first position causes it to couple said second output member to said first output member for inhibiting relative rotation therebetween, and movement of said lock-out clutch to said second position uncouples said first output member from said second output member so as to permit relative rotation therebetween, and wherein said drive connection includes a quill shaft rotatably supported on said second output member and driven by said second input member, said speed reduction apparatus being operably supported on said quill shaft such that movement of said range clutch to said high-range position directly couples said quill shaft to said drive hub, and movement of said range clutch to said low-range position connects an input of said speed reduction apparatus to said quill shaft and an output thereof to said drive hub for driving said drive hub at said reduced low-range speed ratio.

11. A power transfer apparatus for transferring drive torque from a vehicular drivetrain to first and second drivelines, comprising:

a housing;

an input including first input member driven by the drivetrain and support from said housing for rotation about a first rotary axis, a second input member supported from said housing for rotation about a second rotary axis that is angled relative to said first rotary axis, and a constant velocity universal joint interconnecting said second rotary member for rotation with said first input member;

an output including first and second output members respectively interconnected to the first and second drivelines, at least one of said output members being supported from said housing for rotation about a third rotary axis that is offset from said second rotary axis;

a drive member;

a drive connection interconnecting said drive member for driven rotation with said second input member; and a torque transfer device interconnecting said drive member to said first output member for normally transferring drive torque to the first driveline, said torque transfer device operable in an on-demand four-wheel drive mode for transferring drive torque to said second output member in response to a speed differential between said first and second output members for transferring drive torque to both of the first and second drivelines.

12. The power transfer apparatus of claim 11 further comprising:

a lock-out clutch that is operable in a first position for coupling said second output member to said first output member for establishing a part-time four-wheel drive mode, and in a second position for de-coupling said second output member from said first output member to permit operation of said torque transfer device in said on-demand four-wheel drive mode; and a shift mechanism for moving said lock-out clutch between said first and second positions.

13. The power transfer apparatus of claim 12 further comprising a speed reduction apparatus for establishing a direct-drive high-range speed ratio connection and a reduced low-range speed ratio connection between said second input member and said drive member, and a range clutch that is movable between a high-range position for establishing said high-range connection and a low-range position for establishing said low-range connection, said shift mechanism operable for moving said range clutch between said high-range and low-range positions.

14. The power transfer apparatus of claim 13 wherein said shift mechanism includes movement coordinating means for causing coordinated movement of said range clutch and said lock-out clutch for establishing an on-demand high-range four-wheel drive mode, a part-time high-range four-wheel drive mode and a part-time low-range four-wheel drive mode.

15. The power transfer apparatus of claim 13 wherein said range clutch is movable to a neutral position for disconnecting said drive member from driven connection with said second input member so as to establish a neutral non-driven mode.

16. The power transfer apparatus of claim 11 wherein said first and second output members are commonly aligned for relative rotation about said third rotary axis, said drive member including a drive hub rotatably supported on said second output member, and wherein said torque transfer device includes a housing coupling said drive hub to said first output member, a clutch hub fixed to said second output member, a clutch pack including first and second sets of interleaved clutch plates with said first clutch plates fixed for rotation with said housing and said second clutch plates fixed for rotation with said clutch hub, and actuation means for generating and applying a clutch engagement force on said clutch pack for causing drive torque to be transferred from said housing to said clutch hub in response to a speed differential therebetween.

17. The power transfer apparatus of claim 12 wherein said first and second output members are commonly aligned for relative rotation about said third rotary axis, said drive member including a drive hub rotatably supported on said second output member, and wherein said torque transfer device includes a housing coupled for rotation with said drive hub, a clutch hub fixed to said second output member, a clutch pack including first and second sets of interleaved clutch plates with said first clutch plates fixed for rotation with said housing and said second clutch plates fixed for rotation with said clutch hub, and actuation means for generating and applying a clutch engagement force on said clutch pack for causing drive torque to be transferred from said housing to said clutch hub in response to a speed differential therebetween, and wherein said lock-out clutch couples said first output member for rotation with said housing and is mounted for rotation with and axial movement on said first output member, whereby movement of said lock-out clutch to said first position causes it to couple said second output member to said first output member for inhibiting relative rotation therebetween, and movement of said lock-out clutch to said second position uncouples said first output member from said second output member so as to permit relative rotation therebetween.

18. The power transfer apparatus of claim 13 wherein said first and second output members are commonly aligned for relative rotation about said third rotary axis, said drive member including a drive hub rotatably supported on said second output member, and wherein said torque transfer device includes a housing coupled for rotation with said drive hub, a clutch hub fixed to said second output member, a clutch pack including first and second sets of interleaved clutch plates with said first clutch plates fixed for rotation with said housing and said second clutch plates fixed for rotation with said clutch hub, and actuation means for generating and applying a clutch engagement force on said clutch pack for causing drive torque to be transferred from said housing to said clutch hub in response to a speed differential therebetween, and wherein said lock-out clutch couples said first output member for rotation with said housing and is mounted for rotation with and axial movement on said first output member, whereby movement of said lock-out clutch to said first position causes it to couple said second output member to said first output member for inhibiting relative rotation therebetween, and movement of said lock-out clutch to said second position uncouples said first output member from said second output member so as to permit relative rotation therebetween, and wherein said drive connection includes a quill shaft rotatably supported on said second output member and driven by said second input member, said speed reduction apparatus being operably supported on said quill shaft such that movement of said range clutch to said high-range position directly couples said quill shaft to said drive hub, and movement of said range clutch to said low-range position connects an input of said speed reduction apparatus to said quill shaft and an output thereof to said drive hub for driving said drive hub at said reduced low-range speed ratio.

19. A power transfer apparatus for transferring drive torque from a vehicular drivetrain to first and second drivelines, comprising:

an input including a first input member rotatably driven by the drivetrain about a first rotary axis, a second input member supported for rotation about a second rotary axis that is angled relative to said first rotary axis, and a constant velocity universal joint interconnecting said second rotary member for rotation with said first input member;

an output including first and second output members respectively interconnected to the first and second drivelines, at least one of said output members being supported for rotation about a third rotary axis that is offset from said second rotary axis;

a drive member;

a drive connection interconnecting said drive member for driven rotation with said second input member;

a torque transfer device interconnecting said drive member to said first output member for normally transferring drive torque to the first driveline, said torque transfer device operable in an on-demand four-wheel drive mode for transferring drive torque to said second output member in response to a speed differential between said first and second output members for transferring drive torque to both of the first and second drivelines;

a lock-out clutch that is operable in a first position for coupling said second output member to said first output member for establishing a part-time four-wheel drive mode, and in a second position for de-coupling said second output member from said first output member to permit operation of said torque transfer device in said on-demand four-wheel drive mode;

a speed reduction apparatus for establishing a direct-drive high-range speed ratio connection and a reduced low-range speed ratio connection between said second input member and said drive member, and a range clutch that is movable between a high-range position for establishing said high-range connection and a low-range position for establishing said low-range connection; and movement coordinating means for causing coordinated movement of said range clutch and said lock-out clutch for establishing an on-demand high-range four-wheel drive mode, a part-time high-range four-wheel drive mode and a part-time low-range four-wheel drive mode.

20. The power transfer apparatus of claim 19 wherein said range clutch is movable to a neutral position for disconnecting said drive member from driven connection with said second input member so as to establish a neutral non-driven mode.

21. The power transfer apparatus of claim 19 wherein said first and second output members are commonly aligned for relative rotation about said third rotary axis, said drive member including a tubular drive hub rotatably supported on said second output member, and wherein said torque transfer device includes a housing coupled for rotation with said drive hub, a clutch hub fixed to said second output member, a clutch pack including first and second sets of interleaved clutch plates with said first clutch plates fixed for rotation with said housing and said second clutch plates fixed for rotation with said clutch hub, and actuation means for generating and applying a clutch engagement force on said clutch pack for causing drive torque to be transferred from said housing to said clutch hub in response to a speed differential therebetween, and wherein said lock-out clutch couples said first output member for rotation with said housing and is mounted for rotation with and axial movement on said first output member, whereby movement of said lock-out clutch to said first position causes it to couple said second output member to said first output member for inhibiting relative rotation therebetween, and movement of said lock-out clutch to said second position uncouples said first output member from said second output member so as to permit relative rotation therebetween, and wherein said drive connection includes a quill shaft rotatably supported on said second output member and driven by said second input member, said speed reduction apparatus being operably supported on said quill shaft such that movement of said range clutch to said high-range position directly couples said quill shaft to said drive hub, and movement of said range clutch to said low-range position connects an input of said speed reduction apparatus to said quill shaft and an output thereof to said drive hub for driving said drive hub at said reduced low-range speed ratio.

22. A power transfer apparatus for transferring drive torque from a vehicular drivetrain to first and second drivelines, comprising:

an input including a first input member rotatably driven by the drivetrain about a first rotary axis, a second input member supported for rotation about a second rotary axis that is angled relative to said first rotary axis, and a constant velocity universal joint interconnecting said second rotary member for rotation with said first input member;

an output including first and second output members respectively interconnected to the first and second drivelines, said output members being supported for relative rotation about a third rotary axis that is offset from said second rotary axis;

a drive member;

a drive connection interconnecting said drive member for driven rotation with said second input member;

a torque transfer device interconnecting said drive member to said first output member for normally transferring drive torque to the first driveline, said torque transfer device operable in an on-demand four-wheel drive mode for transferring drive torque to said second output member in response to a speed differential between said first and second output members for transferring drive torque to both of the first and second drivelines;

a lock-out clutch that is operable in a first position for coupling said second output member to said first output member for establishing a part-time four-wheel drive mode, and in a second position for de-coupling said second output member from said first output member to permit operation of said torque transfer device in said on-demand four-wheel drive mode;

a speed reduction apparatus for establishing a direct-drive high-range speed ratio connection and a reduced low-range speed ratio connection between said second input member and said drive member, and a range clutch that is movable between a high-range position for establishing said high-range connection and a low-range position for establishing said low-range connection; and movement coordinating means for causing coordinated movement of said range clutch and said lock-out clutch for establishing an on-demand high-range four-wheel drive mode, a part-time high-range four-wheel drive mode and a part-time low-range four-wheel drive mode.

23. The power transfer apparatus of claim 22 wherein said range clutch is movable to a neutral position for disconnecting said drive member from driven connection with said second input member so as to establish a neutral non-driven mode.

24. The power transfer apparatus of claim 22 wherein said first and second output members are commonly aligned for relative rotation about said third rotary axis, said drive member including a drive hub rotatably supported on said second output member, and wherein said torque transfer device includes a housing coupled for rotation with said drive hub, a clutch hub fixed to said second output member, a clutch pack including first and second sets of interleaved clutch plates with said first clutch plates fixed for rotation with said housing and said second clutch plates fixed for rotation with said clutch hub, and actuation means for generating and applying a clutch engagement force on said clutch pack for causing drive torque to be transferred from said housing to said clutch hub in response to a speed differential therebetween, and wherein said lock-out clutch couples said first output member for rotation with said housing and is mounted for rotation with and axial movement on said first output member, whereby movement of said lock-out clutch to said first position causes it to couple said second output member to said first output member for inhibiting relative rotation therebetween, and movement of said lock-out clutch to said second position uncouples said first output member from said second output member so as to permit relative rotation therebetween, and wherein said drive connection includes a quill shaft rotatably supported on said second output member and driven by said second input member, said speed reduction apparatus being operably supported on said quill shaft such that movement of said range clutch to said high-range position directly couples said quill shaft to said drive hub, and movement of said range clutch to said low-range position connects an input of said speed reduction apparatus to said quill shaft and an output thereof to said drive hub for driving said drive hub at said reduced low-range speed ratio.

25. The power transfer apparatus of claim 22 wherein the third rotary axis is substantially parallel to said second rotary axis.

26. The power transfer apparatus of claim 22 wherein said torque transfer device is operable for transferring drive torque to said second output member as a function of the magnitude of said speed differential between said first and second output members.

\* \* \* \* \*